United States Patent Office 3,189,770
Patented June 15, 1965

3,189,770
AXIAL AIRGAP ELECTRIC ROTARY MACHINES
Jacques Henry-Baudot, Antony, France, assignor to
 Societe d'Electronique et d'Automatisme, Courbevoie,
 Seine, France
Filed Aug. 12, 1960, Ser. No. 49,251
Claims priority, application France, Sept. 7, 1959,
 804,744, Patent 1,203,503
17 Claims. (Cl. 310—156)

The present invention concerns improvements in axial airgap electric rotary machines of the kind described in my co-pending application Serial No. 761,144, filed September 15, 1958 (now Patent 3,060,337, October 23, 1962).

A machine according to said co-pending application, operating as an asynchronous motor essentially consists of a two-faced printed circuit winding developed along a ring of thin dielectric annular sheet to the opposite faces of which intimately adhere half-turn conductors interconnected by their inner and outer ends at the peripheries of said sheet, said winding being affixed on a magnetic ring for constituting an A.C. supplied stator, and of a disk-shaped rotor comprising an inner and an outer conductive ring connected by a plurality of substantially radial conductive paths, said rings and said paths being affixed to and partly embedded within a magnetic material member so that such rotor operates as a squirrel-cage one, when submitted to the rotating field of the stator.

A first object of the invention is to so improve such a machine as to obtain a substantial reduction of the "iron" losses therein.

A further object of the invention is to so improve such a machine as to enable it to operate either as a synchronous machine or, at least, as an auto-synchronous machine, viz. a machine adapted to self-synchronize on the A.C. supply.

To such ends, according to the present invention, the stator member of the machine is restricted to a single printed-circuit winding but the rotor is made of two members, one on each side of the stator winding and one of which at least being made as an annular squirrel-cage member, said rotor members incorporating the only iron in the machine.

According to a further feature of the invention, said rotor members are both united together and to the shaft of the machine; the member other than the squirrel-cage one being either a magnetic yoke ring, whereby the machine operates as an asynchronous motor, or a multipolar permanent pole inductor, whereby the machine operates as a synchronous motor.

According to another feature of the invention, only the squirrel-cage rotor member is affixed to the shaft of the machine and the other rotor member is so mounted as to freely rotate around said shaft; the free rotor member may be a magnetic yoke ring, whereby the machine operates as an asynchronous motor, or it may be a multipolar permanent pole inductor, whereby the machine operates as a self-synchronising motor.

In any case, the stator winding is supported by a peripheral portion which may carry the electric terminals or tabs for the A.C. supply to the winding.

These and further features will be more fully disclosed with reference to the accompanying drawings, wherein:

FIGS. 1 to 3 respectively show cross-section views of alternative embodiments of a machine according to the invention;

Figure 1:
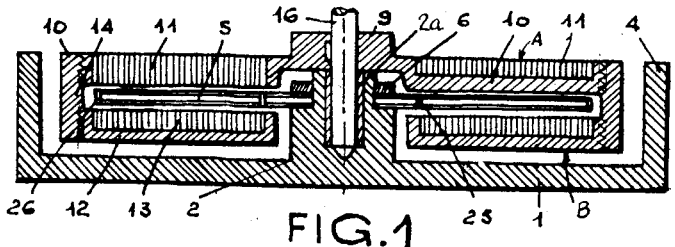
Figure 2:
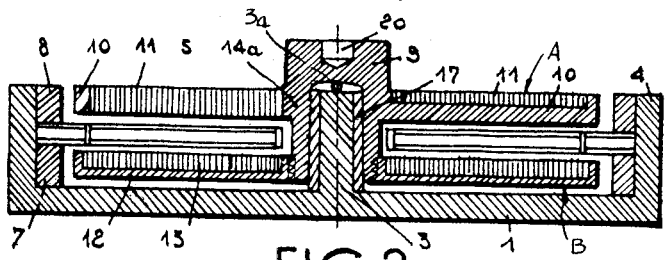
Figure 3:
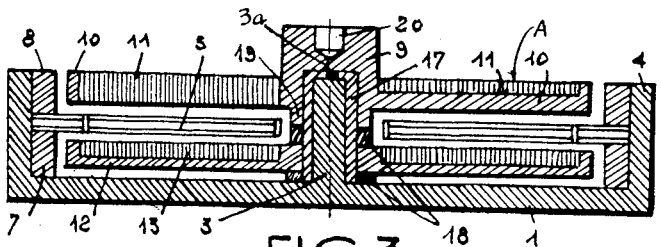
Figure 4:
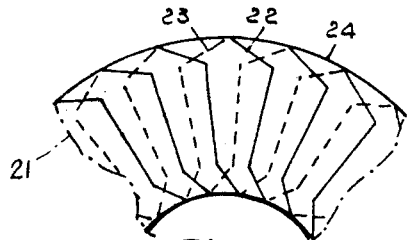
FIG. 4 shows a partial front view of the stator winding in said machine.

Referring to FIGS. 1 to 3, 1 is an annular base plate provided with a flange 4 for mounting the parts of the machine. 5 is a printed-circuit annular two-face winding of the type disclosed in my copending application Serial No. 1,128, now Patent No. 3,144,574, filed January 7, 1960 (which was divided out of Serial No. 691,434, filed October 21, 1957), now Patent No. 3,090,880 and comprising a thin dielectric annular sheet 21, FIG. 4, on the opposite faces of which have been formed, by photo-etching laminar copper for instance, two sets of half-turn conductors, 22 on one side and 23 on the other side, said sets of conductors constituting the required winding pattern when interconnected by their end through-connections 25 and 26, FIG. 1. For instance, this winding pattern is of the series-wave kind as apparent. The through-connections may be made by the known process of hole metallization. The supply terminals are not shown but are arranged as explained above.

Figure 5:
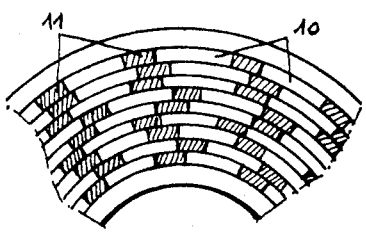
FIG. 5 shows a partial front view of the squirrel-cage rotor member in said machine.

One of the two members constituting the rotor remains the same in each embodiment, it is the squirrel-cage member A. Said member is in all embodiments secured in driving relation to the shaft 16 of the machine. It is a ring arrangement of a squirrel-cage and in FIG. 5 is shown a preferred embodiment thereof according to the above-mentioned co-pending application. The "iron" i.e. the magnetic material part is made of a magnetic tape coiled into a closely wound spiral after it has been previously indented or notched along one edge thereof. Said spiral is moulded within copper which fills the said indentations and further provides continuous conductive rings at the outer and inner peripheries of the spiral. Preferably though not imperatively, the molded assembly includes a hub. In FIG. 5, the copper is referred to as 10 and the iron as 11, as well as on the cross-sections of said member in FIGS. 1 to 3.

Figure 6:
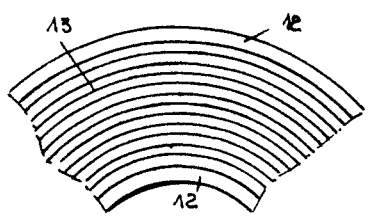
FIGS. 6 and 7 respectively show partial front views of the other rotor member of the machine, consisting of a magnetic yoke in FIG. 6 and of a multipolar inductor in FIG. 7.
Figure 7:
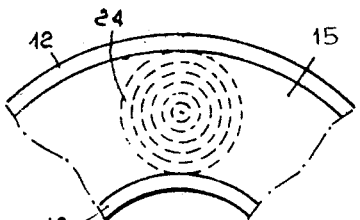

The other rotor member B may be either a mere magnetic yoke for closing the magnetic field through the stator and, for instance as shown in FIG. 6, made of a magnetic tape coiled into a spiral 13 set within a dish-like piece 12, which may be made of copper, or the other rotor member may be formed as an actual magnetic pole structure as shown in FIG. 7 wherein, as an illustrative example, said structure comprises a ring 15 laid within a similar dish-like part 12, said ring being made of a coercive ferrite and wherein magnetic poles such as shown at 24 have been impressed in a remanent fashion by an appropriate and well-known magnetic process. Said magnetic poles alternate in the North and South polarities around the ring 15. Of course, as an alternative, separate magnets, shaped as tablets, may be secured to a back magnetic plate itself housed within such a dish-like member as 12.

Referring specially to FIG. 1, the base plate 1 is shaped by machining or molding, with a central hub 2 having a central bore in which the end of a shaft 16 is housed through an intermediate sleeve 2a. Such an arrangement supplies a rotation bearing for the rotor mounted on said shaft 16, for instance by a pin between said shaft 16 and the rotor hub 9. The stator is supported from the base plate hub 2, being for instance secured to said hub 2 by means of a ring 6 which at its inner periphery grips a reduced portion of hub 2 and holds the stator 5 against a shoulder in said hub 2. The two rotor members are secured together by suitable means, for instance by a threaded ring 14 which is applied to the two rotor members after the rotor members have been mounted on the opposite sides of the stator.

FIG. 2 shows an alternative embodiment which differs from FIG. 1 in two principal respects. First, the base plate 1 is only provided with a central projection 3, a sleeve 17 being guided on said projection, and the sleeve 14a formed integrally with hub 9 being passed over said sleeve 17 for the rotor assembly, the rotor members being on opposite sides of the stator winding. Secondly, the stator 5 is affixed by its outer periphery within the base plate and, for instance, within the flange 4 of said base plate, between rings 7 and 8, the ring 8 at least being formed to have threaded engagement with the inner surface of flange 4 to secure the stator within the housing 1.

In FIG. 3, one of the members of the rotor, the member B which is not made as a squirrel-cage, is free to rotate with respect to the squirrel-cage member A. Said member B is mounted on the sleeve 17 with the intermediary of ball-bearings 18 or the like, the sleeve 14a of the preceding FIG. 2 being omitted, and the hub 9 is provided with a sleeve extension 19 for obtaining the required spacing between the rotor members. Obviously this arrangement which is shown in FIG. 3 derived from FIG. 2 may be directly derived from the assembly of FIG. 1 as well.

In the embodiments of FIGS. 2 and 3, 20 is the housing provided in the end of the sleeve 17 for receiving the end of the shaft of the machine therein, and 3a is a ball for reducing the friction of rotation of the rotor with respect to the projection 3 of the base plate.

When the second member B of the rotor is a magnetic yoke plate, whether said plate is or is not affixed to the shaft, i.e., to the first squirrel-cage member A of the rotor, the machine operates as an asynchronous motor.

When the said second member consists of a magnetic multipolar inductor, and said member B secured to the first member A, the machine operates as a synchronous motor. When said second member B is mounted to freely rotate independently with respect to the first member A, the machine operates as a self-synchronising motor.

In any case, it is of course the squirrel-cage member A which produces the power on the shaft of the machine.

Any technological variation of the above described arrangements falls within the field of the invention as defined by the appended claims.

I claim:

1. An electric motor comprising a stator winding unit including a thin disc of non-magnetic material having a winding formed thereon within an annular portion of the disc, said winding being formed of a series of half-turn conductors attached to one face of said annular portion and a second series of half-turn conductors attached to the other face of said annular portion, the ends of said half-turn conductors being connected to form a winding by interconnections passing from one face of said disc to the other, a first rotor member comprising a disc of magnetic material having a flat annular face mounted to cooperate with said winding through a narrow annular airgap, a squirrel-cage closed circuit winding carried by and distributed about the annular face of said rotor disc and inductively coupled with said stator winding, a shaft mounted for rotation on the axis of said stator winding, means connecting said rotor member in driving relation with said shaft, and a second rotor member formed of an annular ring of magnetic material arranged on the opposite side of said stator winding unit and being magnetically coupled to said first rotor member through said stator winding.

2. Machine according to claim 1, wherein the stator winding is supported by means engaging its inner periphery and the two members of the rotor are united by an outer peripheral ring.

3. Machine according to claim 1, wherein the stator winding is supported by means engaging its outer periphery and the two members of the rotor are united by an inner peripheral sleeve.

4. Machine according to claim 1, wherein the said second rotor member is mounted free to rotate around the axis of the machine.

5. Machine according to claim 1, wherein said second member of the rotor consists of an annular magnetic yoke.

6. Machine according to claim 5, wherein said yoke is made of a spiralled magnetic tape inserted within a dish-shaped carrier.

7. Machine according to claim 1, wherein said second member of the rotor consists of a multipolar inductor structure.

8. Machine according to claim 7, wherein said multipolar inductor structure comprises a ring of coercive ferrite with magnetic poles impressed thereon.

9. Machine according to claim 7, wherein said multipolar inductor structure comprises a series of permanent magnets secured in spaced relation on a magnetic ring yoke.

10. Machine according to claim 1, wherein the magnetic base material of the squirrel-cage member of the rotor consists of a spiralled magnetic tape and the conductive paths therein consist of two outer and inner rings connected by substantially radial conductive paths.

11. Machine according to claim 1, wherein the said stator winding member comprises a thin dielectric sheet coated on both faces with half-turn conductors with through-connections at the respective ends thereof.

12. An axial airgap A.C. supplied electric rotary machine comprising a stator made of a printed-circuit two-face winding of flat annular form, a shaft mounted to rotate on the axis of said winding, a pair of magnetic rotor members mounted to rotate on the axis of said shaft, on opposite sides of said winding, an annular development of a squirrel-cage winding embodied in one of said rotor members and coupled to said stator winding, and means securing said one rotor member in driving relation with said shaft.

13. An axial airgap machine according to claim 12, wherein the other rotor member consists of a magnetic yoke ring.

14. An axial airgap machine according to claim 12, wherein the other rotor member consists of a ring of permanent magnet poles.

15. An axial airgap machine according to claim 12 wherein the other rotor member is mounted to freely rotate around the axis of the first rotor member.

16. An axial airgap machine according to claim 15, wherein the said other rotor member consists of a magnetic yoke ring.

17. An axial airgap machine according to claim 15, wherein the said other rotor member consists of a ring of permanent magnet poles.

References Cited by the Examiner

UNITED STATES PATENTS 2,751,513   6/56   Bessiere _____ 310—268 X
2,873,395   2/59   Kober _____ 310—268 X

OTHER REFERENCES

"D.C. Motor Has Printed Armature," Electronics, March 20, 1959.

MILTON O. HIRSHFIELD, *Primary Examiner.*

ORIS L. RADER, *Examiner.*